May 5, 1959 H. H. FELDER 2,885,493
ECHO SUPPRESSOR CIRCUITS
Filed Dec. 5, 1955
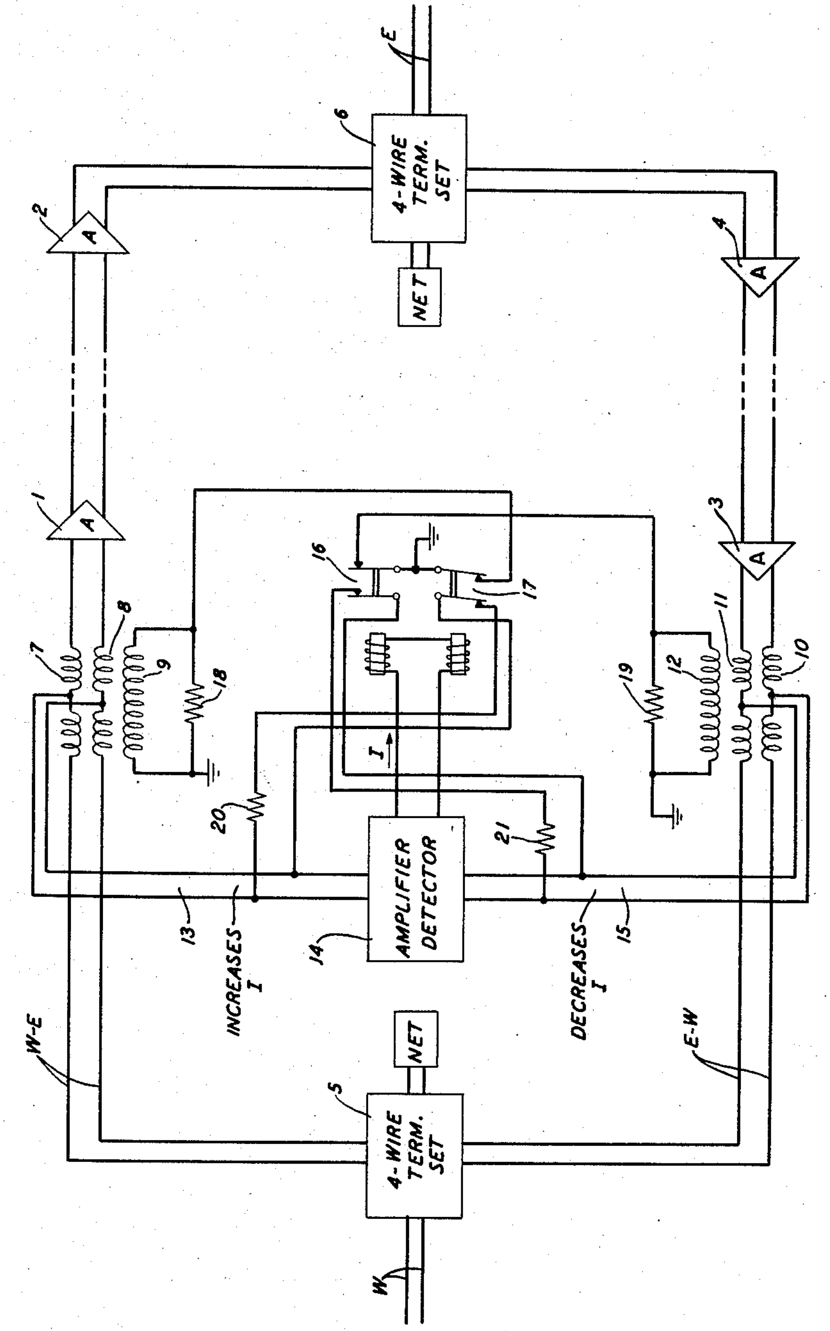
INVENTOR
H. H. FELDER
BY R. B. Ardis
ATTORNEY United States Patent Office 2,885,493

Patented May 5, 1959

2,885,493
ECHO SUPPRESSOR CIRCUITS

Harry H. Felder, White Plains, N.Y., assignor to Bell Telephone Laboratories, Incorporated, New York, N.Y., a corporation of New York Application December 5, 1955, Serial No. 551,119

8 Claims. (Cl. 179—170.8)

This invention relates generally to two-way signal transmission systems such as telephone systems and more particularly to the signal-controlled switching circuits used in such systems to suppress echoes.

Signal currents which are returned from reflections at line irregularities and mismatches in a two-way telephone system are reduced to two components, that which circulates through repeaters causing singing and that which returns all the way to the ear of the talker. Delay due to the finite velocity of transmission of the circuit causes the latter component to sound in the talker's ear like an echo of his own voice. The transmission effects of singing and echo are different. Actual singing is a trouble condition which puts the circuit out of service. Near singing causes a distortion which impairs faithful reproduction of the transmitted signal at the receiving end of the circuit. Echo, on the other hand, represents a distracting annoyance which, in extreme cases, can impair intelligibility. It is primarily with the effects of echo that echo suppressors have been developed to deal.

An echo suppressor is primarily a voice-operated switching device which inserts large values of loss in the echo path of a telephone system while either subscriber is talking. In general, an echo suppressor usually employs two switching branches, each connected to a respective one of the two oppositely directed signal transmission paths at a terminal or intermediate point of the two-way system and each including means to detect applied signals and electromagnetic relays or other switching means to disable the respectively opposite signal transmission path. As the subscriber at one end of the system begins to talk, his voice signals travel over the one-way signal transmission path directed toward the listening subscriber (e.g., the path from west to east) and actuate the echo suppressor branch responsive to that path. The actuated echo suppressor branch inserts a large loss in the return path (e.g., the path from east to west), disabling it. Echoes returning to the talker by way of the return path are thereby suppressed. During speech pauses the relay disabling the return path releases after a delay interval and restores the system to its original condition. If the other subscriber should talk, a complementary action would occur, with the echo suppressor branch associated with the original return path operating to disable the original talking path.

Most existing echo suppressors are, however, somewhat of a mixed blessing. While effectively suppressing echoes they may introduce additional transmission impairments peculiar to themselves. Break-in difficulties are one example. If a listener wishes to interrupt a talker, he must generally apply a higher input to his echo suppressor branch than the talker is applying to his in order to gain control of the circuit. Another example is the condition known as lockout. In a telephone connection involving two or more widely separated echo suppressors, one subscriber may succeed in operating one echo suppressor and the other subscriber another. Under such conditions all conversation languishes until silence on the part of one or both subscribers permits the system to return to normal.

The principal object of the present invention is to make it easier for the listener to interrupt or break in on the talker in a conversation over a telephone circuit equipped with an echo suppressor.

Another and more specific object is to permit the listener in a conversation over a telephone circuit equipped with an echo suppressor to break in on the talker without waiting for the latter to pause and without having to out-shout him if he does not.

A related object is to make it easier to override a lockout condition in a long telephone circuit equipped with two or more echo suppressors.

These objects are attained, in accordance with the invention by increasing the sensitivity of the echo suppressor in one direction at the same time speech is being transmitted in the opposite direction. The listener is thereby given a volume advantage over the talker and, when he chooses to interrupt, can do so and seize directional control of the system without either having to wait for the talker to cause or having to speak more loudly than the talker. In the event of a lockout condition in a telephone connection involving two or more widely separated echo suppressors, this increased ease of breaking in on a talker tends to create more intervals during which the lockout condition can be overridden.

One important embodiment of the invention takes the form of an echo suppressor which includes resistors bridged across the respective control paths leading from each unidirectional transmission path to the associated branch of the echo suppressor and switching means operative simultaneously and in synchronism with the echo suppressor in response to signals transmitted over each oppositely directed transmission path to remove the bridged resistor. Removal of the bridged resistor has the effect of decreasing the loss of the control path and increasing the sensitivity of the echo suppressor in favor of the listening subscriber with respect to the next transmission initiated by him. Other important embodiments of the invention may utilize pads inserted in the respective echo suppressor control paths instead of the bridged resistors. Still other embodiments may involve electronically controlled means for increasing the sensitivity of the respective echo suppressor control paths.

A more complete understanding of the present invention may be obtained by a study of the following detailed description of a specific embodiment using resistors bridged across the respective echo suppressor control paths. The single figure of the drawing illustrates such an embodiment.

The illustrated embodiment of the invention includes a pair of bilateral voice-frequency transmission lines labeled W and E, for west and east, respectively. These lines represent the terminal portions of a long repeatered voice-frequency telephone circuit, the principal portion of which is made up of a pair of oppositely directed one-way transmission lines labeled W–E and E–W, respectively. Line W–E is shown, by way of example, having a pair of one-way repeaters 1 and 2 spaced along its length, and line E–W is shown with a similar pair of oppositely directed repeaters 3 and 4. At their extreme ends, one-way lines W–E and E–W are joined to the respective bilateral lines W and E in a conventional manner by respective four-wire terminating sets 5.

The echo suppressor in the illustrated embodiment of the invention is located near one end of the system. A first hybrid coil has three windings 7, 8, and 9, two of which 7 and 8 are connected in the two line conductors of one-way line W–E. A second hybrid coil has three windings 10, 11, and 12 and is similarly connected, with windings 10 and 11 connected in the two line conductors of line E–W. An echo suppressor control path from line W–E is formed by a two-wire circuit 13 connected from the respective midpoints of windings 7 and 8 to an amplifier-detector 14. A similar control path from line E–W is formed by a two-wire circuit 15 connected from the respective mid-points of windings 10 and 11 to amplifier-detector 14.

The operating coils of a pair of electromagnetic relays 16 and 17 are connected in series across the output of amplifier-detector 14. Relay 16 may, for example, have stronger spring tension than relay 17. Amplifier-detector 14, on the other hand, provides a biasing current I through the relay operating coils so that, with no signal from either control circuit 13 or control circuit 15, relay 17 is operated but relay 16 is not. A signal on the E–W line appears on control circuit 15 and opposes biasing current I, releasing relay 17 and leaving relay 16 unoperated. A signal on the W–E line, on the other hand, appears on control circuit 13 and aids biasing current I, operating both relays. Signals on both lines cancel one another if they are of equal magnitude and leave relays 16 and 17 in the same condition as in the absence of signals.

A pair of resistors 18 and 19 are connected across hybrid coil windings 9 and 12, respectively, to provide the disabling loss that is inserted into each of the one-way lines by the echo suppressor. One side of each resistor is grounded. The ungrounded side of resistor 18 is connected to a front contact associated with a first armature of relay 17. The ungrounded side of resistor 19, on the other hand, is connected to a back contact associated with the corresponding armature of relay 16. Both of these armatures of relays 16 and 17 are connected to ground.

As has already been pointed out, the present invention is particularly featured by an arrangement for increasing the sensitivity of the echo suppressor in one direction at the same time speech is being transmitted over the telephone line in the opposite direction. In the illustrated embodiment of the invention, sensitivity control is provided by second armatures on both relays 16 and 17 and by a pair of resistors 20 and 21. Resistor 20 is connected between one side of W–E control circuit 13 and a front contact associated with the second armature of relay 17, while the other side of control circuit 13 is connected to the second armature itself. Resistor 21 is connected from one side of E–W control circuit 15 to a back contact associated with the second armature of relay 16, while the other side of control circuit 15 is connected to the armature itself.

The operation of the illustrated embodiment of the invention is best described by considering separately the various operating conditions with which it is faced in service. The first is that which occurs with no signal transmission on either line E–W or line W–E. The condition of the echo suppressor is then as illustrated. Relay 17 is operated and relay 16 is unoperated. The resistance terminations on both hybrids are shorted and normal transmission can take place in both directions, traversing only the coil losses and the low transhybrid losses. The sensitivity control resistors 20 and 21 are bridged across both echo suppressor control circuits 13 and 15, adding loss thereto.

When the E subscriber begins to talk, his speech signals traverse the E–W line and part of them actuate amplifier-detector 14 from control circuit 15. The current I through the relay windings decreases sufficiently to release relay 17, restoring the resistive termination to the W–E hybrid, balancing the input resistance of control circuit 13, and causing a high transhybrid to be inserted into the W–E transmission path. The W–E transmission path is thereby disabled and prevented from becoming a return path for echoes. At the same time, in accordance with the invention, the release of relay 17 causes resistor 20 to be removed from its position across control circuit 13. The loss of control circuit 13 is thereby reduced and its sensitivity increased. When talking on the E–W line ceases, relay 17 operates and the circuit is restored to its original condition after the hangover interval. The hangover interval is the length of time the loss must be retained after the final speech signal to allow for its travel to the far end of the circuit and the return of its echo.

When the W subscriber speaks, his speech signals traverse the W–E line and part of them actuate amplifier-detector 14 from control circuit 13. The current through the relay windings increases and operates relay 16, leaving relay 17 in its operated condition. The resistive termination is restored to the E–W hybrid and a large transhybrid loss is inserted in the E–W transmission path, disabling it. At the same time, resistor 21 is removed from the circuit and the sensitivity of amplifier-detector 14 to signals from control circuit 15 is substantially increased. When talking ceases, the circuit is again restored to its original condition.

The importance of the invention is apparent when the operation of the system is considered for conditions occurring when one subscriber attempts to break in upon another. If, for example, the E subscriber is talking, the W subscriber may wish to break in and seize control of the circuit without waiting for him to pause. With the E subscriber talking, the E–W line is carrying signals, causing the relay current to be below normal and both relays 16 and 17 to be released. While the W subscriber on the W–E line cannot now be heard over the circuit because of the suppression loss introduced by resistor 18 and the W–E hybrid, his speech energy can and does enter control circuit 13 and increases the relay current. In the past, he had to talk louder than the subscriber on the E–W path for a period longer than the hangover time to increase the relay current sufficiently to operate relays 16 and 17. In accordance with the present invention, however, the sensitivity of control circuit 13 is increased above normal as soon as the E subscriber takes control. It is, therefore, not necessary for the W subscriber to talk as loudly as the talker on the E–W path in order to break in. In this manner, the increase in control circuit sensitivity makes it easier for the W subscriber to take directional control of the system.

The E subscriber may break in on the W subscriber in the illustrated embodiment of the invention in much the same way. When the W subscriber takes directional control of the telephone circuit, causing the E–W line to be disabled, the sensitivity of control circuit 15 is increased by the removal of resistor 21. The echo suppressor is thereby biased in favor of subsequent directional control by the E subscriber, and his next transmission need not rise to the amplitude level of that of the W subscriber in order to permit him to restore the E–W path and to disable the W–E path.

As has been indicated, it sometimes happens that on a connection involving two or more widely separated echo suppressors, the talkers lock one another out by simultaneous operation of two echo suppressors. The improvement in ability to break in afforded by the present invention also has the effect of creating more intervals during which the lockout condition can be overridden. If there is loss between the two echo suppressors, the one nearest the talker has a sensitivity advantage over the distant one and tends to maintain a lockout condition. The invention transfers some or all of this advantage to the distant talker and reduces the volume level required for successful breaking in.

The magnitude of the echo suppressor control circuit sensitivity change featured by the invention is, in general, limited by several factors. In the first place, the sensitivity of the control circuits should not be made so high that breaking in would be caused by breath sounds or other weak sounds made by a listener having no intention of breaking in. In the second place, echoes of loud speech sounds made by a talker should not operate the breaking circuit in the opposite direction. Finally, neither circuit noise nor room noise at the listening end should be able to operate the breaking circuit. While the actual amount of increase in sensitivity depends upon the particular physical installation to which it is desired to apply the invention, it will in general be of the order of from five to ten decibels.

Embodiments of the invention other than that which has been described may utilize other means of increasing the sensitivity of the respective echo suppressor control circuits. That means may, for example, take the form of pads which can be switched in and out of the respective control circuits. Still another alternative is a circuit causing a fixed change in the output of amplifier-detector 14. In controlling the output of amplifier-detector 14, the amount of change is made to depend upon the strength of the speech currents which it is desired to break. When shunt resistors or pads are used, on the other hand, they are made to produce the desired amount of suppression in the respective control paths.

It is to be understood that the above-described arrangements are illustrative of the application of the principles of the invention. Numerous other arrangements may be devised by those skilled in the art without departing from the spirit and scope of the invention.

What is claimed is:

1. In a two-way signal transmission system which includes a first one-way signal path for signals traveling in one direction and a second one-way signal path for signals traveling in the opposite direction, first switching means responsive to signals transmitted over said first signal path to disable said second signal path, a control path for said first switching means connected between said first switching means and said first signal path, second switching means responsive to signals transmitted over said second signal path to disable said first signal path, a control path for said second switching means connected between said second switching means and said second signal path, third switching means operative simultaneously and in synchronism with said first switching means in response to signals transmitted over said first signal path to reduce the loss in said control path for said second switching means, and fourth switching means operative simultaneously and in synchronism with said second switching means in response to signals transmitted over said second signal path to reduce the loss in said control path for said first switching means, whereby when one of said signal paths is disabled in response to signals transmitted over the other of said signal paths said system is conditioned to shift directional control to the next subsequent signals transmitted over said one of said signal paths even though they are smaller in magnitude than the signals on said other signal path then maintaining directional control.

2. A combination in accordance with claim 1 which includes a first impedance connected across said control path for said first switching means and a second impedance connected across said control path for said second switching means and in which said third switching means includes means to remove said second impedance from said control path for said second switching means and said fourth switching means includes means to remove said first impedance from first control path for said first switching means.

3. A combination in accordance with claim 1 which includes a first resistance connected across said control path for said first switching means and a second resistance connected across said control path for said second switching means and in which said third switching means includes means to remove said second resistance from said control path for said second switching means and said fourth switching means includes means to remove said first resistance from said control path for said first switching means.

4. In a two-way telephone system which includes a pair of oppositely directed one-way transmission paths for transmitting signals between subscribers at opposite ends of said system, respective echo suppression means to disable each of said transmission paths in response to the signal transmission of the subscriber on the other of said transmission paths, echo suppressor control paths connected between each of said transmission paths and its respectively responsive one of said echo suppression means, and switching means operative simultaneously and in synchronism with each of said echo suppression means to reduce the loss in the said control path between the one of said transmission paths being disabled and the respective one of said echo suppression means responsive to it, whereby when one of said transmission paths is disabled in response to signal transmission of the talking subscriber on the other of said transmission paths said system is conditioned to give the listening subscriber on said disabled transmission path a volume advantage over the talking subscriber with respect to subsequent directional control of said system.

5. A combination in accordance with claim 4 which includes respective impedances connected across each of said control paths and in which each of said switching means includes means to remove the said impedance from the said control path between the one of said transmission paths being disabled and the respective one of said echo suppression means responsive to it.

6. A combination in accordance with claim 4 which includes respective resistances connected across each of said control paths and in which each of said switching means includes means to remove the said resistance from the said control path between the one of said transmission paths being disabled and the respective one of said echo suppression means responsive to it.

7. In a two-way signal transmission system which includes a pair of oppositely directed one-way paths for signals transmitted in opposite directions, respective echo suppression means to disable each of said one-way paths in response to signals transmitted over the other of said one-way paths, respective echo suppressor control paths connected between each of said one-way paths and said echo suppression means, impedance means connected in each of said control paths to reduce the transmission efficiency thereof, and switching means operative simultaneously and in synchronism with said echo suppression means to disconnect said impedance means from the one of said control paths associated with the one of said one-way paths being disabled, giving the said one-way path when disabled a volume advantage over the other of said one-way paths with respect to subsequent directional control of said system.

8. In a two-way signal transmission system which includes a pair of oppositely directed one-way paths for signals transmitted in opposite directions, differentially operated echo suppression means to disable each of said one-way paths in response to signals transmitted over the other of said one-way paths, a control path between a predetermined portion of one of said one-way paths and said echo suppression means, a control path between a predetermined portion of the other of said one-way paths and said echo suppression means, resistance means connected across each of said control paths to reduce the transmission efficiency thereof, and switching means operative simultaneously and in synchronism with said echo suppression means to disconnect said resistance means from the one of said control paths connected to the one of said one-way paths being disabled, giving the said one-way path when disabled a volume advantage over the other of said one-way paths with respect to subsequent directional control of said system.

References Cited in the file of this patent

UNITED STATES PATENTS

| | | |
|---|---|---|
| 2,083,645 | Fracassi | June 15, 1937 |
| 2,254,733 | Dickieson | Sept. 2, 1941 |
| 2,322,833 | Dickieson et al. | June 29, 1943 |

FOREIGN PATENTS

| | | |
|---|---|---|
| 456,827 | Great Britain | Nov. 16, 1936 |